United States Patent
Danell

(10) Patent No.: US 11,705,830 B2
(45) Date of Patent: Jul. 18, 2023

(54) ELECTROMECHANICAL MOTOR AND TUNABLE FILTER COMPRISING AN ELECTROMECHANICAL MOTOR

(71) Applicant: Acuvi AB, Uppsala (SE)

(72) Inventor: Andreas Danell, Vattholma (SE)

(73) Assignee: ACUVI AB, Uppsala (SE)

(*) Notice: Subject to any disclaimer, the term of this patent is extended or adjusted under 35 U.S.C. 154(b) by 41 days.

(21) Appl. No.: 17/432,652

(22) PCT Filed: Feb. 21, 2020

(86) PCT No.: PCT/SE2020/050202
§ 371 (c)(1),
(2) Date: Aug. 20, 2021

(87) PCT Pub. No.: WO2020/171770
PCT Pub. Date: Aug. 27, 2020

(65) Prior Publication Data
US 2022/0077793 A1 Mar. 10, 2022

(30) Foreign Application Priority Data
Feb. 22, 2019 (SE) .................................... 1950233-5

(51) Int. Cl.
*H02N 2/02* (2006.01)
*H01P 1/207* (2006.01)
(Continued)

(52) U.S. Cl.
CPC ............. *H02N 2/026* (2013.01); *H01P 1/207* (2013.01); *H01P 7/10* (2013.01); *H02N 2/006* (2013.01); *H02N 2/0015* (2013.01); *H02N 2/04* (2013.01)

(58) Field of Classification Search
CPC ...... H02N 2/026; H02N 2/0015; H02N 2/006; H02N 2/04; H01P 1/207; H01P 7/10
See application file for complete search history.

(56) References Cited

U.S. PATENT DOCUMENTS 9,287,599 B1 3/2016 White et al.
11,251,510 B2 * 2/2022 Persson ................... H01P 1/207
(Continued)

FOREIGN PATENT DOCUMENTS

EP 194532 A2 9/1986
EP 2258004 B1 1/2012
(Continued)

OTHER PUBLICATIONS

International Search Report issued in PCT/SE2020/050202 dated Apr. 28, 2020.
European Search Report dated Jun. 5, 2023 in EP 20759498.7.

*Primary Examiner* — Emily P Pham
(74) *Attorney, Agent, or Firm* — Fox Rothschild LLP; Carol E. Thorstad-Forsyth

(57) ABSTRACT

An electromechanical motor (1) comprises a stator (2) and a translator (10). The stator has two electromechanical actuators (20) having electromechanically active material (26) and means (35) for providing exciting signals. The translator is arranged between, and in driving contact with, driving portions (22) of the electromechanical actuators. The stator has a spring element (30) arranged for holding the driving portions against the translator. The electromechanical actuators are arranged for providing a vibration, which gives rise to a driving action, directed in a driving direction (X) perpendicular to the direction of the normal force, against the surface of the translator. The electromechanical motor further comprises a guiding means (50) having a circular hole (52). The translator has a cylindrically shaped guidance part (16) arranged at least partly in the circular hole. A tunable high-frequency filter comprising such a motor is also disclosed.

20 Claims, 4 Drawing Sheets

(51) Int. Cl.
*H01P 7/10* (2006.01)
*H02N 2/00* (2006.01)
*H02N 2/04* (2006.01)

(56) References Cited

U.S. PATENT DOCUMENTS

2003/0234596 A1   12/2003   Johansson et al.
2007/0096599 A1    5/2007   Mattsson et al.
2007/0164635 A1    7/2007   Witteveen et al.

FOREIGN PATENT DOCUMENTS

WO      2005031888 A1      4/2005
WO      2007051689 A1      5/2007
WO      2009000862 A2     12/2008
WO      2019035757 A1      2/2019

* cited by examiner

ELECTROMECHANICAL MOTOR AND TUNABLE FILTER COMPRISING AN ELECTROMECHANICAL MOTOR

CROSS-REFERENCE TO RELATED APPLICATIONS

The present application is a U.S. National Phase of International Patent Application No. PCT/SE2020/050202 which was filed on Feb. 21, 2020 and claims priority to Swedish Patent No. 1950233-5 which was filed on Feb. 22, 2019. The contents of the listed patent documents are incorporated herein by reference in their entireties.

TECHNICAL FIELD

The present technology refers in general to electromechanical motors and in particular to such motors suitable for being included in tunable filters.

BACKGROUND

Information and Communication Technology (ICT) is striving for transmitting radio signals at higher frequencies to fit more and more data at higher communication speed. To communicate with high data density, the frequency band needs to be limited. This is normally provided by use of a radio-frequency filter. As the frequencies used is increased, the size of the filter needs to be physically smaller.

Making these filters tunable is an important factor in order to provide flexibility. Provision of tunable filters also keeps the number of filter versions limited since more general filters can be used. One critical part of a tunable filter is to fit the mechanical system that provides the actual tunability of the filter. The tunability is commonly achieved by moving a dielectricum into a cavity of the filter. The size of the motor providing this motion and the mechanics around it becomes essential.

For previous generations of tunable filters the dielectricum is typically controlled by DC-motors, or stepper motors, in all cases with a linear screw or spindle to translate the rotary motion into a linear motion. This is, however, a too space-consuming solution for 5G-filters, due to decreasing physical sizes.

A piezo-motor is a good choice for the application, since the size can be very compact, while still providing a rather high force output. Also, a piezo-motor can hold its position over long time with no current consumption. Making the motor as compact as possible is therefore crucial. Piezo-motors can thus in principle be used, but so far, all proposed solutions for the bearing and guiding of the translator part takes too much place to make it compact enough.

SUMMARY

A general object is to provide a more compact motor solution, appropriate for tunable radio-frequency filters.

The above object is achieved by methods and devices according to the independent claims. Preferred embodiments are defined in dependent claims.

In general words, in a first aspect, an electromechanical motor comprises a stator and a translator. The stator has two electromechanical actuators. Each of the electromechanical actuators has electromechanically active material and means for providing exciting signals to the electromechanically active material. The translator is arranged between, and in driving contact with, driving portions of the electromechanical actuators. The stator has a spring element arranged for holding the driving portions of the electromechanical actuators with a normal force against a respective surface of the translator. The electromechanical actuators are arranged for providing a vibration, which gives rise to a driving action against the surface of the translator. The driving action is directed in a driving direction perpendicular to the direction of the 5 normal force. The electromechanical motor further comprises a guiding means having a circular hole. The circular hole has a circular-symmetry axis that is parallel to the driving direction. The translator has a cylindrically shaped guidance part. The guidance part is arranged at least partly in the circular hole of the guiding means.

In a second aspect, a tunable high-frequency filter comprises a resonator block, encapsulating a resonance cavity. The tunable high-frequency filter further comprises a signal input and a signal output, connected by the resonator block. A dielectric volume is arranged to be movable into the resonance cavity. The tunable high-frequency filter further comprises an electromechanical motor according to the first aspect. The stator of the electromechanical motor is mechanically attached to the resonator block. The guiding means of the electromechanical motor constitutes a part of the resonator block. The dielectric volume is a part of, or attached to, the guidance part of the translator of the electromechanical motor.

One advantage with the proposed technology is that this solution saves space and the number of needed components is small.

Other advantages will be appreciated when reading the detailed description.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the drawings, the same reference numbers are used for similar or corresponding elements.

For a better understanding of the proposed technology, it may be useful to begin with a brief discussion of general electromechanical motors based on excitation of electromechanically active material.

In the present disclosure, electromechanically active materials are defined as materials that change their shape when an electric voltage or current is applied. Typical examples of electromechanical materials are piezoelectric, electrostrictive and antiferroelectric materials and these materials could be single crystalline as well as polycrystalline or amorphous.

Electromechanical motors and actuators, and in particular piezoelectric motors and actuators, are available in a huge number of varieties. One way to classify the devices is to divide them according to their driving mechanism. One commonly used driving principle is to use an electromechanical actuator having electromechanically active material. The electromechanical actuator is held in driving contact with a body to be moved, e.g. a translator, typically by means of a spring element, providing a normal force. Means for providing exciting signals to the electromechanically active material are connected to the electromechanical actuator, and when voltages or currents are exciting the electromechanically active material, the electromechanical actuators are arranged for providing a vibration, which gives rise to a driving action against a surface of the translator. The driving action is directed in a driving direction perpendicular to the direction of the normal force. This driving principle is, as such, well known in prior art and will not be discussed in more detail.

Examples of motors using such driving mechanisms can be found e.g. in the published International Patent application WO 2005/031888 A1 or in the published International Patent application WO 2007/051689 A1.

However, this type of driving requires only extremely compact driving arrangements while still maintaining an adequate driving force. The driving forces in relation to size is therefore very high, and such a motor is therefore a good candidate for being used whenever small volume drive is requested.

When using a vibrating electromechanical actuator of this kind, the translator has to be movable, not only in relation to the electromechanical actuator, but typically also with respect to the spring element. A straight-forward solution is thereby to use some kind of bearing arrangement. However, when going to very small motors, bearing arrangements tend to be quite voluminous compared to the rest of the motor arrangement and requires often precision mounting procedures.

Figure 1:
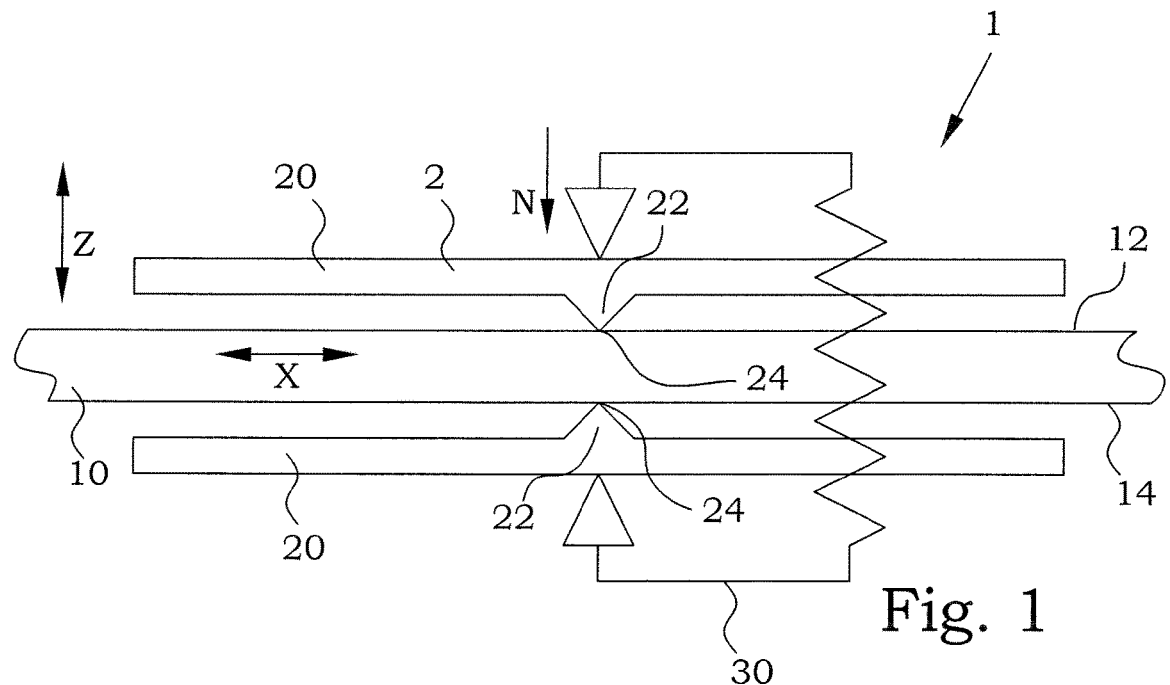
FIG. 1 illustrates schematically an embodiment of a twin-actuator design.

An alternative is to use a so-called twin-actuator design, where the stator has two electromechanical actuators. FIG. 1 illustrates schematically one embodiment of a twin-actuator design. An electromechanical motor 1 comprises two electromechanical actuators 20. The electromechanical actuators 20 are arranged on opposite sides of a translator 10. The translator 10 is thereby arranged between and in driving contact with driving portions 22 of the electromechanical actuators 20. The driving portions 22 have thus a contact 24 with the driving surfaces 12, 14 of the translator 10, at least during part of a driving cycle. The contact 24 can be a point contact, a line contact or a small-area contact. With such a design, a spring element 30 can be arranged for pressing the electromechanical actuators 20 against each other with a normal force N, with the translator 10 there between. Since the electromechanical actuators 20 are stationary with respect to each other, no additional bearing arrangement in connection with the spring element 30 is needed. Since electromechanical actuators 20 today can be produced in a very 5 compact design, such a twin-actuator design may require less volume than a bearing-based solution. The direction of the normal force is in this disclosure referred to as the Z direction, while the driving direction is denoted as the X direction. A Y direction is defined as pointing inwards into the paper of FIG. 1.

A minor drawback by omitting the bearing arrangement is that guiding properties that the bearing arrangements typically give also is removed. Depending on the application of the motor, different kinds of guiding arrangements have to be provided instead.

The electromechanical actuators do indeed provide a guiding in the translational direction of the normal force. The translation in the driving direction is the requested action by the motor and should not be influenced. The third translation, perpendicular to the normal force and perpendicular to the driving direction is, however, non-guided.

Furthermore, rotation of the translator around an axis parallel to driving direction is only prohibited by the geometrical design of the contact points of the electromechanical actuators. Furthermore, the two other rotation possibilities, around an axis in the normal force direction or around an axis perpendicular to both the normal force direction and the driving direction, are more or less not restricted at all, at least for minor rotations.

Figure 2:
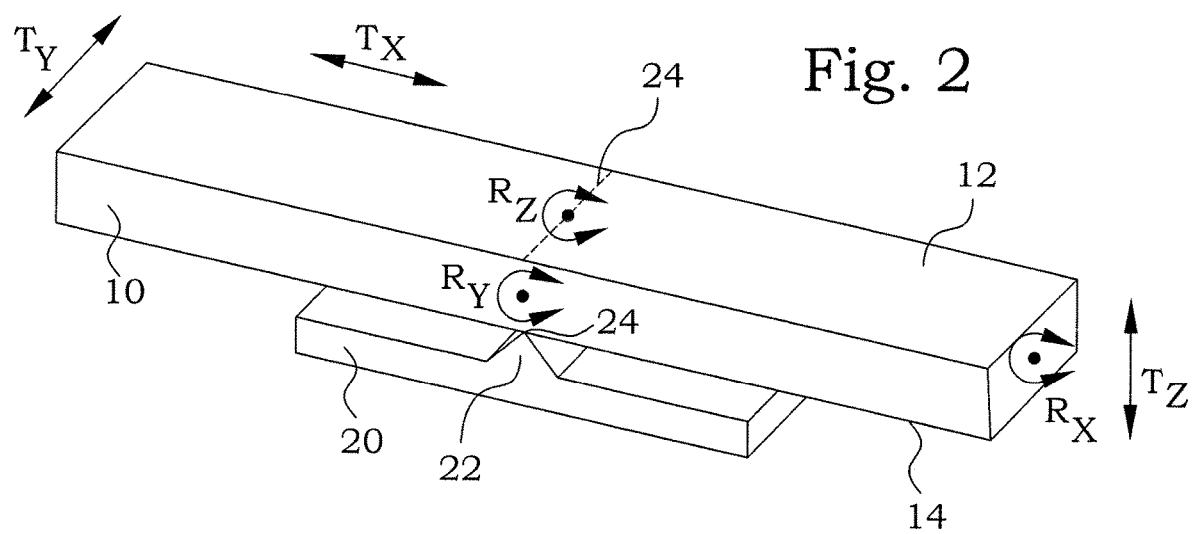
FIG. 2 illustrates principles of motion restrictions in a twin-actuator design.

The situation is schematically illustrated in FIG. 2. Here, one of the electromechanical actuators is removed in order to increase the readability. The contact 24 is in this embodiment a line contact. The existence of the electromechanical actuators 20 on each side prohibits the translator 10 to translate in the Z direction. In other words, no linear motion in the $T_Z$ is permitted. Due to the line type of contact 24, also any rotation around the X axis $R_X$ is prohibited or at least considerably obstructed. The translation in the $T_X$ direction is the requested one and is of course not obstructed.

However, the twin-actuator design, as such, do not provide any efficient means for mitigating unwanted translations in the $T_Y$ direction, and do not obstruct rotations of the translator 10 around the $R_Z$ axis or the $R_Y$ axis.

In other words, a twin solution motor with one contact point from each side of a drive rod or translator needs some kind of guiding of the linear translator to be able to move. This request needs extra components that typically makes the motor design more complex and expensive, but also demands extra space. The need of guiding is typically determined by the requirements of the application in which the motor is used. In certain cases, some translations and/or rotations may be permitted, while others have to be carefully controlled.

In the particular case of a tunable filter, a dielectricum is required to be moved in and out within a cavity. Typically, the most important parameter to be controlled is the distance the dielectricum is moved. The exact shape of the dielectricum is, however, typically of less importance. For instance, the dielectricum may be designed as a cylinder, being moved in and out in a circular hole. Preferably, the cylinder has a diameter equal, within clearance margins, to a diameter of the circular hole. The exact rotation of the cylinder within the hole then becomes of negligible importance. By using this geometrical relation between the dielectricum and an enclosure of the cavity, a guiding action can be provided. Furthermore, this guiding is achieved by parts that are already present in the arrangement, which means that no further guiding means have to be provided. Translations in the directions perpendicular to the driving direction are efficiently prohibited by the interaction between the cylinder and the circular hole. Likewise, rotations of the cylinder around axes in directions differing from the symmetry axis of the cylinder, are also restricted. Only motions parallel to the cylinder axis and rotations around the cylinder axis are permitted.

A cylinder and a circular hole can easily manufactured and easily included in many applications, and it has been found that the basic principles of using the combination of a cylinder and circular hole as guiding arrangement in connection with a twin-actuator electromechanical motor are advantageous in many different applications. This motor approach can in principle be used in e.g. all applications where a minor rotation around the driving axis may be permitted.

Figures 3A, 3B:
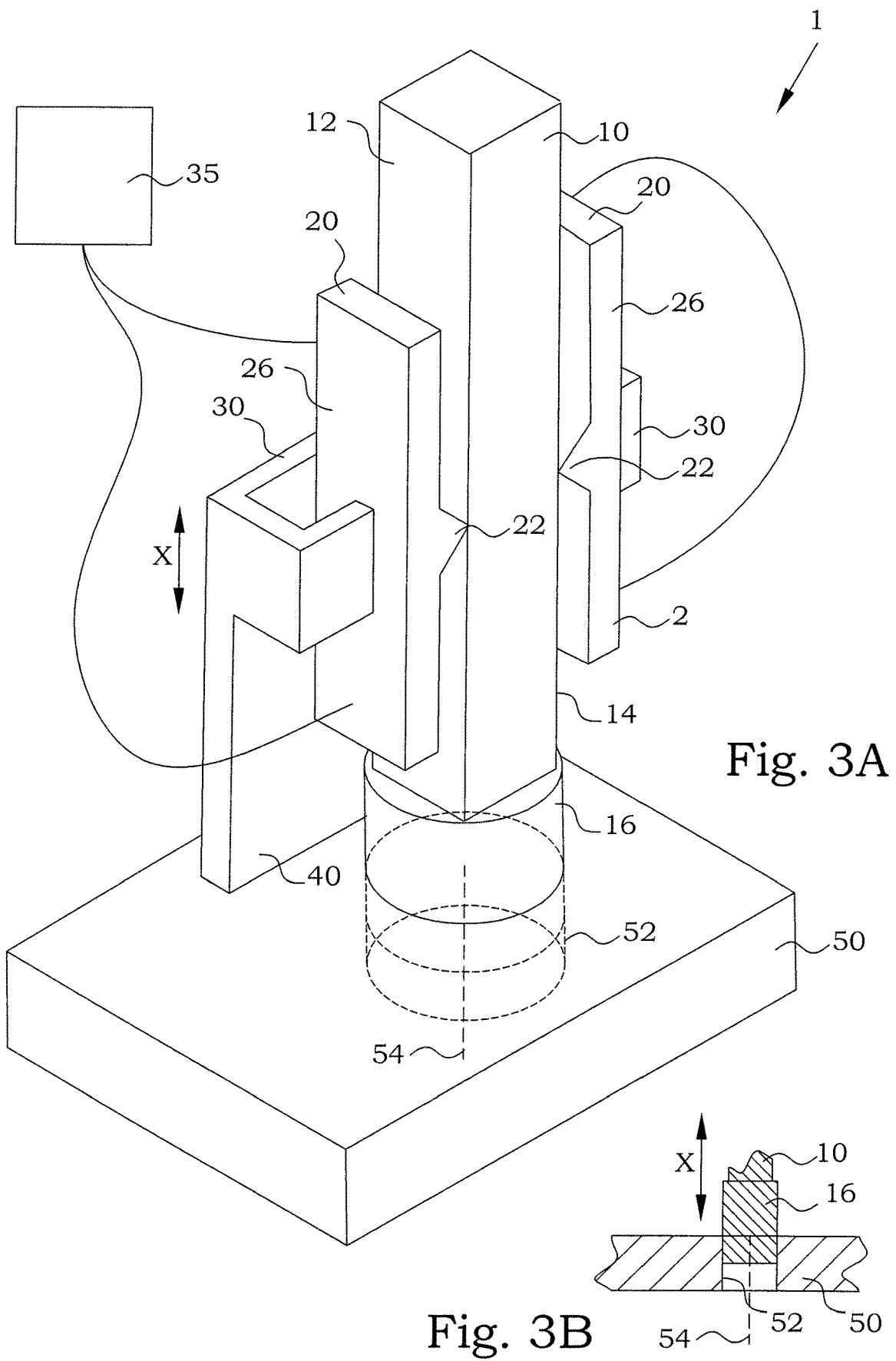
FIGS. 3A-B illustrate an embodiment of an electromechanical motor.

FIG. 3A illustrates an embodiment of an electromechanical motor 1. The electromechanical motor 1 comprises a stator 2 having two electromechanical actuators 20. Each of the electromechanical actuators 20 has electromechanically active material 26 and means 35 for providing exciting signals to the electromechanically active material 26. The electromechanical motor 1 further comprises a translator 10. The translator 10 is arranged between and in driving contact with driving portions 22 of the electromechanical actuators 20. The stator 2 has a spring element 30 arranged for holding the driving portions 22 of the electromechanical actuators 20 with a normal force against a respective surface 12, 14 of the translator 10.

The electromechanical actuators 20 are, when excited by the exciting signals, arranged for providing a vibration. This vibration gives rise to a driving action against the surface 12, 14 of the translator 10. The provision of such driving action is, as such, well known for a person skilled in the prior art, as was mentioned further above. The driving action is directed in a driving direction perpendicular to the direction of said normal force, i.e. in the X direction illustrated in the Figure.

The electromechanical motor 1 further comprises a guiding means 50 having a circular hole 52. The circular hole 52 has a circular-symmetry axis 54 being parallel to the driving direction X. The translator 10 has a cylindrically shaped guidance part 16. The guidance part 16 is arranged at least partly in the circular hole 52 of the guiding means 50.

A part of a cross-sectional view of the electromechanical motor is illustrated in FIG. 3B.

In other words, an electromechanical motor with two contact points (driving portions) from two opposite sides acting on a moving object, translator, will not be able to control the translator position unless it is guided in some parts.

A cylinder shape moving in a cavity having a circular hole can act as the needed guiding together with the two driving portions.

Preferably, the guidance part 16 has a diameter equal, within clearance margins, to a diameter of the circular hole 52. The clearance margins are ordinary clearance margins for sliding fit or slip fit, according to ISO standards.

When inserting a cylinder into a hole, there is always a risk that the motion is jammed due to a minor misalignment. In order to mitigate such problems, in a preferred embodiment, the radius of the circular hole 52 should be kept small compared to the length of the circular hole 52. Preferably, a ratio between the length and diameter of the circular hole 52 is larger than a friction coefficient between the circular hole 52 and the guiding means 50, more preferably larger than two times the friction coefficient and most preferably larger than three times the friction coefficient.

In a preferred embodiment, the vibration is a bending vibration that has its strokes in a direction of the normal force when the electromechanically active material is excited.

Preferably, the driving contact between the driving portions 22 of each of the electromechanical actuators 20 and the translator 10 is a point or linear contact. Most preferably, the driving contact between the driving portions 22 of each of the electromechanical actuators 20 and the translator 10 is a linear contact.

As mentioned above, there are many different kinds of electromechanical actuators that can be used for the present purpose. Some, non-exclusive, examples are e.g. to be found in the published International patent applications WO 2005/031888 A1 and WO 2007/051689 A1. However, also other types of electromechanical actuators are possible to use.

Figure 4:
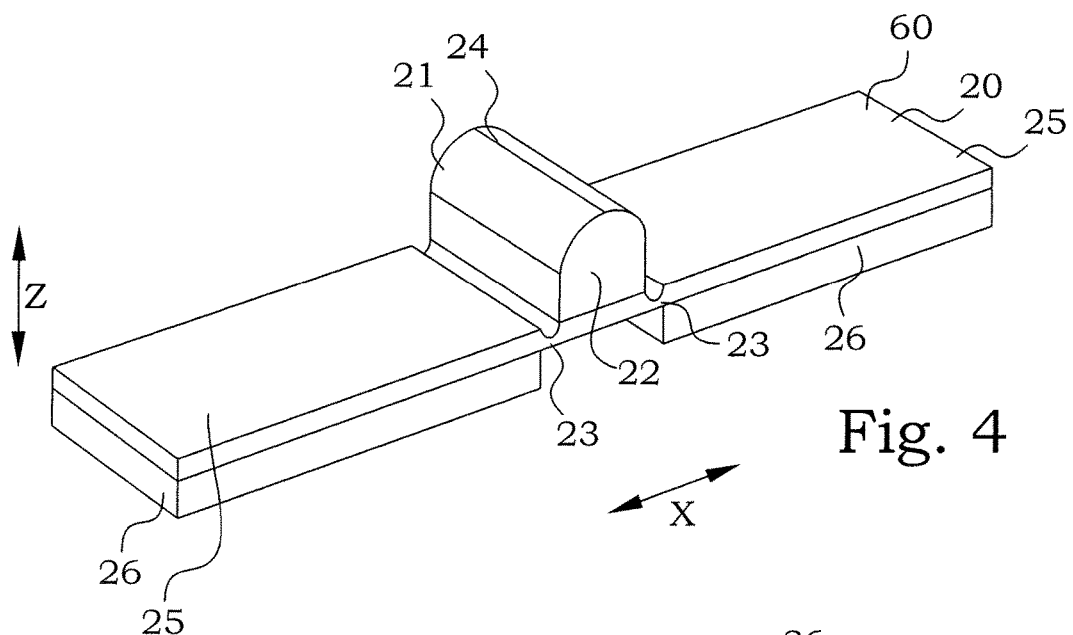
FIG. 4 illustrates an embodiment of an electromechanical actuator.

In one embodiment, a linked electromechanical motor can be used. FIG. 4 illustrates an embodiment of an electromechanical actuator 20. The electromechanical actuator 20 comprises two vibration bodies 25, connected by a link member 21 along the driving direction X. Each of the vibration bodies 25 comprises a respective electromechanical element 26 comprising the electromechanically active material. The vibration bodies 25 are configured to perform the bending vibrations together with the link member 21. The link member 21 has a contact portion 22 intended for the point or linear contact 24 with the surface of the translator. The two vibration bodies 25 and the link member 21 together constitute a vibration assembly.

Preferably, the electromechanical actuator 20 comprise a metal sheet 60, which constitutes at least a part of the link member 21. The metal sheet 60 also constitutes a support of the electromechanically active material of the vibration bodies 25. In this particular embodiment, the metal sheet 60 presents weakening notches 23 at each contact between respective vibration body 25 and the link member 21. This allows more independent motion modes for the link member.

Figure 5:
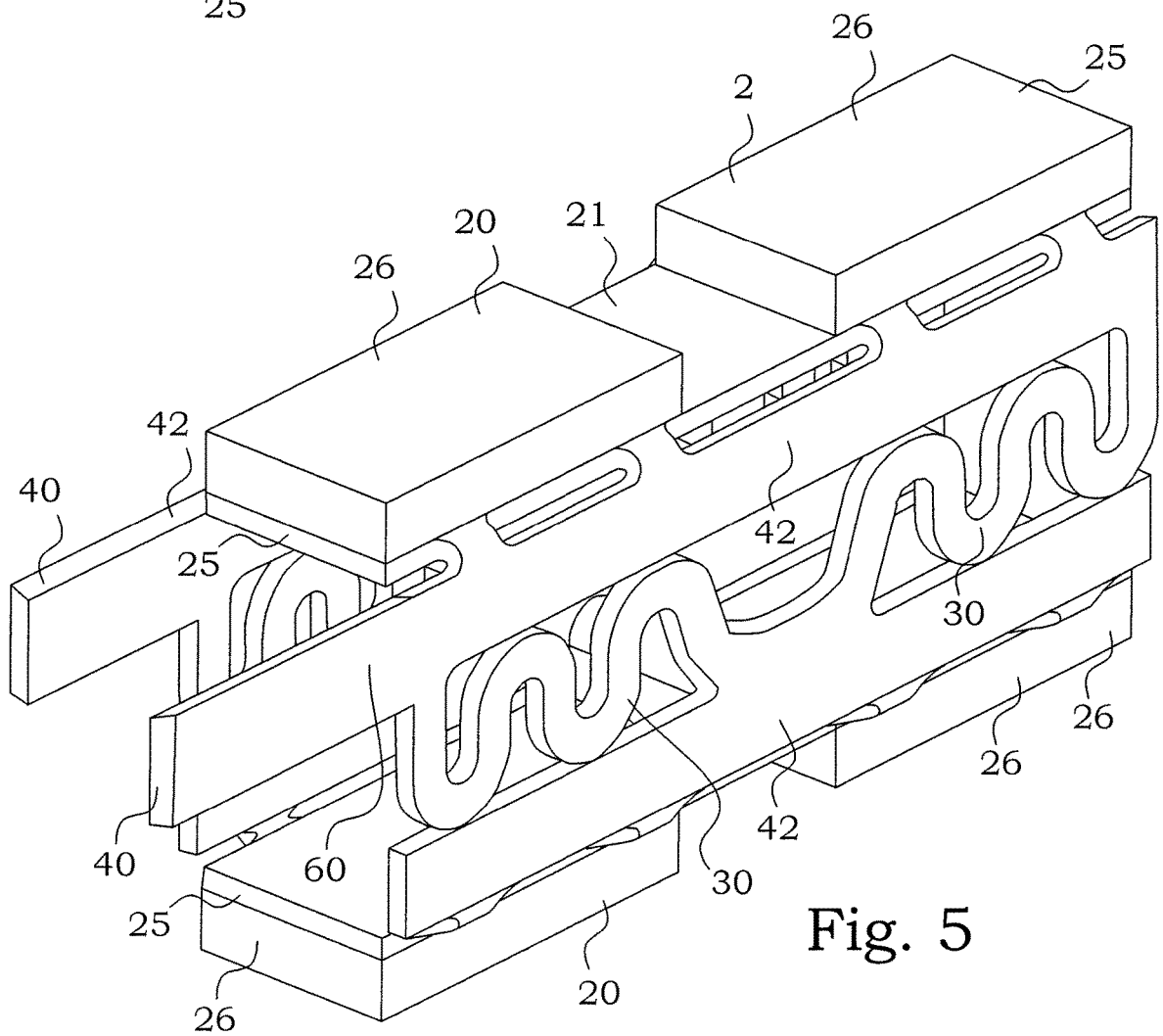
FIG. 5 illustrates an embodiment of a stator of an electromechanical motor.

The metal sheet 60 may also, in further embodiments, be used for other purposes in the electromechanical motor as well. FIG. 5 illustrates an embodiment of a stator 2 of an electromechanical motor. The metal sheet 60 is in this embodiment used both as a support structure and also a part of the spring solution. One electromechanical actuator 20 is provided from the top 5 and one electromechanical actuator 20 is provided from the bottom. A translator is thus intended to be provided through the interior of the illustrated structure. The driving portions of the electromechanical actuator 20 are therefore directed inwards and are not easily seen in the illustration. The electromechanical element 26 are consequently provided at the outside of the structure. The metal sheet 60 is in this embodiment not only used as a part of the electromechanical actuators 20, but is also used as a stator support 42 for the electromechanical actuators 20. The stator support 42 can also further be used as connectors 40, for connecting the stator 2 to e.g. the guiding means or any other mechanical part of the application where it is used. The metal sheet can easily be bended in a way that mounting holes can be placed in an appropriate position relative to any surface to which it is intended to be mounted.

In other words, each of the vibration bodies 25 are mechanically attached to the stator support 42. This stator support 42 is mechanically attached, at least indirectly, to the guiding means, e.g. via the connectors 40. In this particular embodiment, the metal sheet 60 constitutes at least a part of the stator support 42. The stator support 42 is thus directly mechanically attached to the guiding means via at least one connector 40.

In this embodiment, the metal sheet 60 is also used as the spring element 30. The metal sheet 60 is thereby cut out in a meandering shape to increase the elastic behaviour. In other words, the metal sheet 60 further constitutes at least a part of the spring element 30.

In alternative embodiment, connectors for connecting the stator to e.g. the guiding means can be provided in other positions. One possibility is e.g. to have the spring element provided in two parts and attach the connectors between these spring element parts and the guiding means or any other mechanical part of the application where it is used. In such a design, the electromechanical actuators are permitted to vibrate without restriction directly from the connectors, since a part of the spring element is provided there between. In other words, the stator support 42 is indirectly mechanically attached to the guiding means via at least one connector 40 attached between two parts of a spring element.

Figure 6:
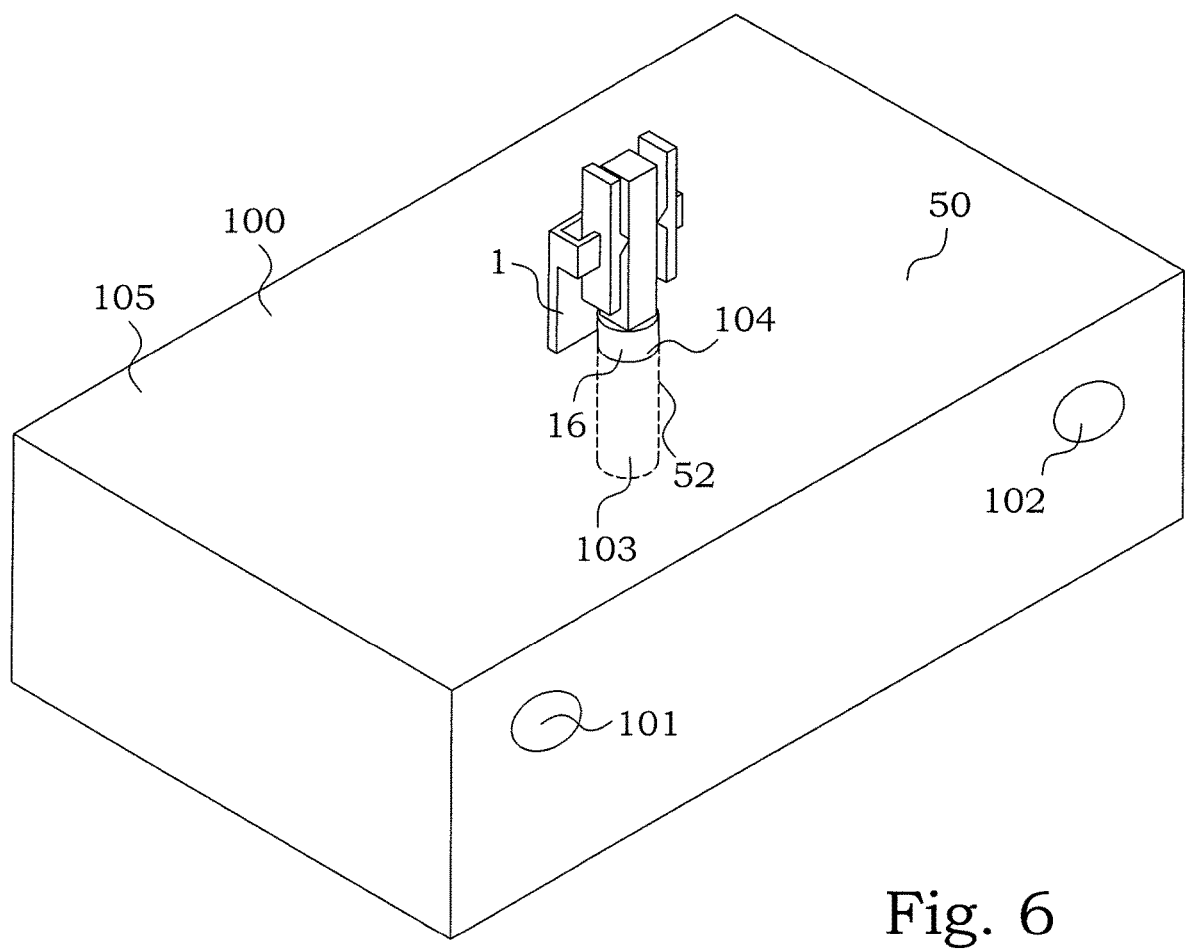
FIG. 6 illustrates an embodiment of a tunable high-frequency filter.

As mentioned further above, the present ideas where developed with the application on a tunable filter in mind. FIG. 6 illustrates an embodiment of such an application. A tunable radio-frequency filter 100 comprises a resonator block 105, encapsulating a resonance cavity 103. The tunable high-frequency filter 100 has a signal input 101 and a signal output 102, connected by the resonator block. A dielectric volume 104 is arranged to be movable into the resonance cavity 103. An electromechanical motor 1 according to the principles presented here above is mechanically attached by its stator to the resonator block 105. The guiding means 50 of the electromechanical motor 1 constitutes a part of the resonator block 105. The dielectric volume 104 is a part of or attached to the guidance part 16 of the translator of the electromechanical motor 1.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. An electromechanical motor, comprising:
   a stator having two electromechanical actuators;
   each of said two electromechanical actuators having electromechanically active material and means for providing exciting signals to said electromechanically active material;
   a translator, arranged between and in a driving contact with driving portions of said electromechanical actuators;
   said stator having a spring element arranged for holding said driving portions of said two electromechanical actuators with a normal force against a respective surface of said translator;
   wherein said two electromechanical actuators being arranged for providing a vibration, which gives rise to a driving action against said surface of said translator;
   wherein said driving action is directed in a driving direction perpendicular to said direction of said normal force,
   a guiding means having a circular hole; said circular hole having a circular-symmetry axis being parallel to said driving direction;
   wherein said translator has a cylindrically shaped guidance part; and wherein said cylindrically shaped guidance part is arranged at least partly in said circular hole of said guiding means.

2. The electromechanical motor according to claim 1, wherein said cylindrically shaped guidance part has a diameter equal, within clearance margins, to a diameter of said circular hole.

3. The electromechanical motor according to claim 1, wherein said circular hole has a ratio between its length and its diameter thereof being larger than a friction coefficient between the circular hole and the guiding means, preferably larger than two times said friction coefficient, and most preferably larger than three times said friction coefficient.

4. The electromechanical motor according to claim 1, wherein said vibration is a bending vibration having strokes in a direction of said normal force when said electromechanically active material is excited.

5. The electromechanical motor according to claim 1, wherein each of said two electromechanical actuators comprises two vibration bodies, connected by a link member along said driving direction; each of said two vibration bodies comprises a respective electromechanical element comprising said electromechanically active material; said two vibration bodies are configured to perform one or more bending vibrations together with said link member; said link member having a contact portion intended for a point or linear contact with said surface of said translator; whereby said two vibration bodies and said link member together constitute a vibration assembly.

6. The electromechanical motor according to claim 5, further comprising a metal sheet, constituting at least a part of said link member and constituting a support of said electromechanically active material of said two vibration bodies.

7. The electromechanical motor according to claim 5, wherein each of said two vibration bodies being mechanically attached to a stator support; said stator support being mechanically attached, at least indirectly, to said guiding means.

8. The electromechanical motor according to claim 5, further comprising a metal sheet, constituting at least a part of said link member and constituting a support of said electromechanically active material of said two vibration bodies, wherein each of said two vibration bodies being mechanically attached to a stator support, wherein said stator support being mechanically attached, at least indirectly, to said guiding means, wherein said metal sheet further constitutes at least a part of said stator support.

9. The electromechanical motor according to claim 8, wherein said metal sheet further constitutes at least a part of said spring element.

10. The electromechanical motor according to claim 7, wherein said stator support is directly mechanically attached to said guiding means by at least one connector.

11. The electromechanical motor according to claim 7, wherein said stator support is indirectly mechanically attached to the guiding means via at least one connector attached between two parts of said spring element.

12. The electromechanical motor according to claim 1, wherein said driving contact between said driving portions of each of said two electromechanical actuators and said translator is a point or line contact.

13. The electromechanical motor according to claim 12, wherein said driving contact between said driving portions of each of said two electromechanical actuators and said translator is a line contact.

14. A tunable radio-frequency filter, comprising: a resonator block, encapsulating a resonance cavity; a signal input and a signal output, connected by said resonator block; a dielectric volume arranged to be movable into said resonance cavity and the electromechanical motor according to claim 1; wherein said stator of said electromechanical motor is mechanically attached to said resonator block; wherein said guiding means of said electromechanical motor constitutes a part of said resonator block; and wherein said dielectric volume is at least a part of or attached to said cylindrically shaped guidance part of said translator of said electromechanical motor.

15. The electromechanical motor according to claim 2, wherein said circular hole has a ratio between its length and its diameter thereof being larger than a friction coefficient between the circular hole and the guiding means, preferably larger than two times said friction coefficient, and most preferably larger than three times said friction coefficient.

16. The electromechanical motor according to claim 2, wherein said vibration is a bending vibration having strokes in a direction of said normal force when said electromechanically active material is excited.

17. The electromechanical motor according to claim 3, wherein said vibration is a bending vibration having strokes in a direction of said normal force when said electromechanically active material is excited.

18. The electromechanical motor according to claim 15, wherein said vibration is a bending vibration having strokes in a direction of said normal force when said electromechanically active material is excited.

19. The tunable radio-frequency filter according to claim 14, wherein said cylindrically shaped guidance part has a diameter equal, within clearance margins, to a diameter of said circular hole.

20. The tunable radio-frequency filter according to claim 14, wherein said circular hole has a ratio between its length and its diameter thereof being larger than a friction coefficient between the circular hole and the guiding means, preferably larger than two times said friction coefficient, and most preferably larger than three times said friction coefficient.

\* \* \* \* \*